(12) United States Patent
Machida

(10) Patent No.: US 7,391,466 B2
(45) Date of Patent: Jun. 24, 2008

(54) CAMERA MODULE WITH DUST TRAP

(75) Inventor: Akihiro Machida, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 704 days.

(21) Appl. No.: 10/838,281

(22) Filed: May 4, 2004

(65) Prior Publication Data

US 2005/0248684 A1  Nov. 10, 2005

(51) Int. Cl.
*H04N 5/225* (2006.01)

(52) U.S. Cl. ...................... 348/374; 250/239

(58) Field of Classification Search ............. 348/373, 348/374, 340, 335; 250/239; 257/433, 434; 359/819; 396/25
See application file for complete search history.

(56) References Cited

U.S. PATENT DOCUMENTS

| | | | | |
|---|---|---|---|---|
| 5,233,379 A | * | 8/1993 | Burnham | ............... 396/346 |
| 5,516,838 A | * | 5/1996 | Fujiki et al. | ............... 524/711 |
| 5,767,448 A | * | 6/1998 | Dong | ............... 174/74 A |
| 5,828,918 A | | 10/1998 | Abe et al. | |
| 5,838,495 A | * | 11/1998 | Hennick | ............... 359/507 |
| 6,038,087 A | * | 3/2000 | Suzuki et al. | ............... 359/819 |
| 6,583,819 B2 | | 6/2003 | Ito et al. | |
| 7,006,138 B2 | * | 2/2006 | Kawai | ............... 348/340 |
| 7,006,291 B2 | * | 2/2006 | Hori et al. | ............... 359/580 |
| 2001/0055072 A1 | | 12/2001 | Mogamiya et al. | |
| 2002/0167605 A1 | * | 11/2002 | Akimoto et al. | ............ 348/374 |
| 2003/0202114 A1 | | 10/2003 | Takizawa et al. | |
| 2003/0214599 A1 | * | 11/2003 | Ito et al. | ............ 348/335 |
| 2003/0218685 A1 | | 11/2003 | Kawai | |
| 2004/0090549 A1 | * | 5/2004 | Takizawa et al. | ............ 348/340 |
| 2004/0239794 A1 | * | 12/2004 | Saito et al. | ............ 348/340 |

* cited by examiner

*Primary Examiner*—Ngoc-Yen Vu
*Assistant Examiner*—Kent Wang
(74) *Attorney, Agent, or Firm*—RatnerPrestia

(57) ABSTRACT

A camera module for capturing an image. The camera module including an image sensor including a die mounted on a substrate, a housing coupled with the substrate to substantially enclose the die, and a dust trap substance adhered to the housing configured to capture and maintain at least one dust particle to decrease movement of dust particles within the housing, which decreases a number of blemishes in the captured image.

17 Claims, 4 Drawing Sheets

CAMERA MODULE WITH DUST TRAP

BACKGROUND

Conventional digital cameras are configured to collect light bouncing off of the subject onto an image sensor through a lens. The image sensor immediately breaks down the light pattern received into a series of pixel values that are processed to form the end digital image of the subject.

Digital image technology is being used with increasing popularity leading to increasing production volumes. The increased production volumes are due not only to the increasing popularity of conventional digital cameras, but also due to miniature fixed-focused digital cameras being incorporated into various end products, such as mobile telephones (cellular telephones), personal digital assistants (PDA's), and other electronic devices.

However, during the manufacture of the digital camera modules, dust is often trapped within the camera module. Eventually, a portion of the trapped dust may impact the image sensor, more particularly, a die of the image sensor within the camera module and cause harm to the digital images produced. In particular, pixels created by the image sensor are extremely small, and any dust from the lens housing captured by the image sensor may cover one or more pixels of the entire image produced. In particular, a dust particle of approximately $5\mu$ is large enough to cover an entire pixel of the image sensor die. By covering a pixel of the image sensor die, the end digital image is produced with a black dot where the covered pixel was to appear. As such, it is desirable to decrease the amount of dust particles contacting the image sensor die.

However, it is unlikely, or at least not cost efficient, to remove the presence of dust during the manufacturing process. For example, digital cameras are typically manufactured in a controlled environment classified under Federal Standard 209D as a class 1,000 environment. The clean room class 1,000 environment requires that less than 1,000 particles sized $0$-$5\mu$ and less than 7 particles sized $5\mu$ are found in each cubic foot of the clean room. Manufacturing a camera module within this environment will allow dust measuring between $0$-$5\mu$ to be trapped inside of the camera module during manufacturing.

In addition, a camera module housing may be attached with screws to the image sensor and the lens or lens barrel is threadably attached to the camera module housing. The screw hole and barrel threads have relatively fine pitch and, as such, create small crevices that collect and essentially trap dust that cannot be effectively removed during manufacture. In particular, a blower cannot force air inside of the threads to remove the dust due at least in part to the small size of the threads. With this in mind, dust is left trapped within and between the camera module housing and the image sensor.

Subsequent movement and use of the camera module, in particular, subsequent twisting of the lens barrel, eventually releases the once trapped dust particles. In addition, camera housings are often comprised of a plastic material with glass filler particles. Movement and use of the camera module oftentimes pulls, grinds away, or removes a glass particle or a portion of the glass particle from the composite plastic material. The released glass particle contributes to the dust particles already present in the digital camera module. The released dust particles, whether the result of dust in the manufacturing process or of glass dust from the composite plastic material, often impact the image sensor resulting in undesirable blemishes of the digital image produced by the digital camera as described above.

SUMMARY

One aspect of the present invention relates to a camera module for capturing an image. The camera module including an image sensor including a die mounted on a substrate, a housing coupled with the substrate to substantially enclose the die, and a dust trap substance adhered to the housing configured to capture and maintain at least one dust particle to decrease movement of dust particles within the housing, which decreases a number of blemishes in the captured image.

BRIEF DESCRIPTION OF THE DRAWINGS

Embodiments of the invention are better understood with reference to the following drawings. Elements of the drawings are not necessarily to scale relative to each other. Like reference numerals designate corresponding similar parts.

DETAILED DESCRIPTION

In the following detailed description, reference is made to the accompanying drawings, which form a part hereof, and which is shown by way of illustration specific embodiments in which the invention may be practiced. In this regard, directional terminology such as "top," "bottom," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
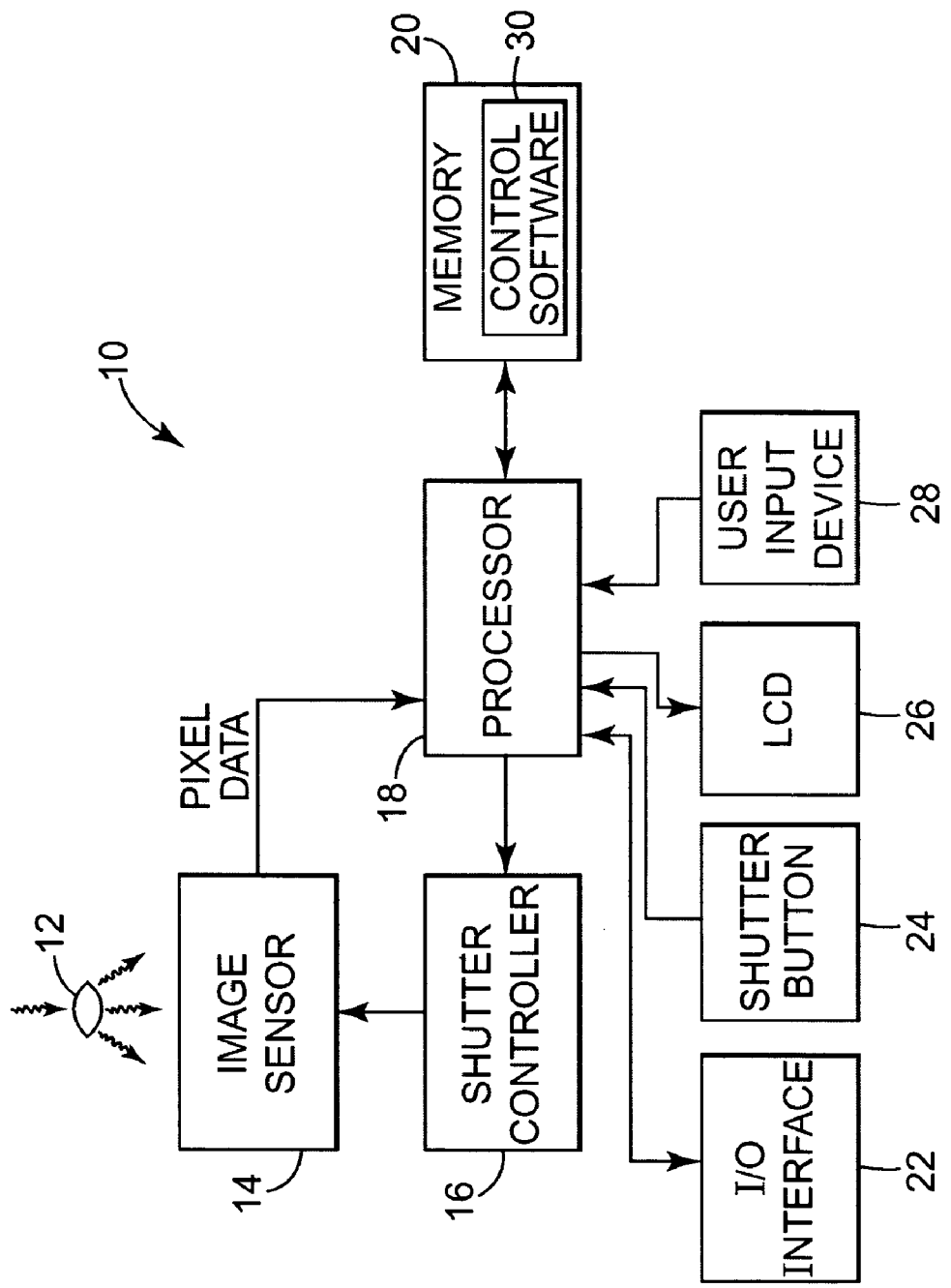
FIG. 1 is a block diagram illustrating major components of a digital camera.

FIG. 1 is a block diagram illustrating major components of a digital camera 10. Camera 10 includes a primary lens 12, an image sensor 14, a shutter controller 16, a processor 18, a memory 20, an input/output (I/O) interface 22, a shutter button 24, a liquid crystal display (LCD) 26, and a user input device 28. In operation, when a user presses shutter button 24, processor 18 and shutter controller 16 cause image sensor 14 to capture light bouncing off of a subject (not shown) through primary lens 12. Image sensor 14 converts the captured light into pixel data, and outputs the pixel data representative of the image to processor 18. In one embodiment, image sensor 14 is a charged coupled device (CCD) or a complimentary metal oxide semiconductor (CMOS).

The pixel data is stored in memory 20, and captured images may be displayed on LCD 26. In one embodiment, memory 20 includes some type of random access memory (RAM) and non-volatile memory, but can include any known type of memory storage. In one embodiment, memory 20 includes a type or programmable read-only memory (PROM) such as electrically erasable programmable read-only memory (EEPROM). Memory 20 includes control software 30 for controlling processor 18. I/O interface 22 is configured to be coupled to a computer or other appropriate electronic device (e.g., a PDA, a mobile or cellular telephone, etc.) (not illustrated), for transferring information between the electronic device and digital camera 10, including downloading captured images from camera 10 to the electronic device. User input device 28 allows a user (not shown) to vary the user definable settings of the camera 10.

Figure 2:
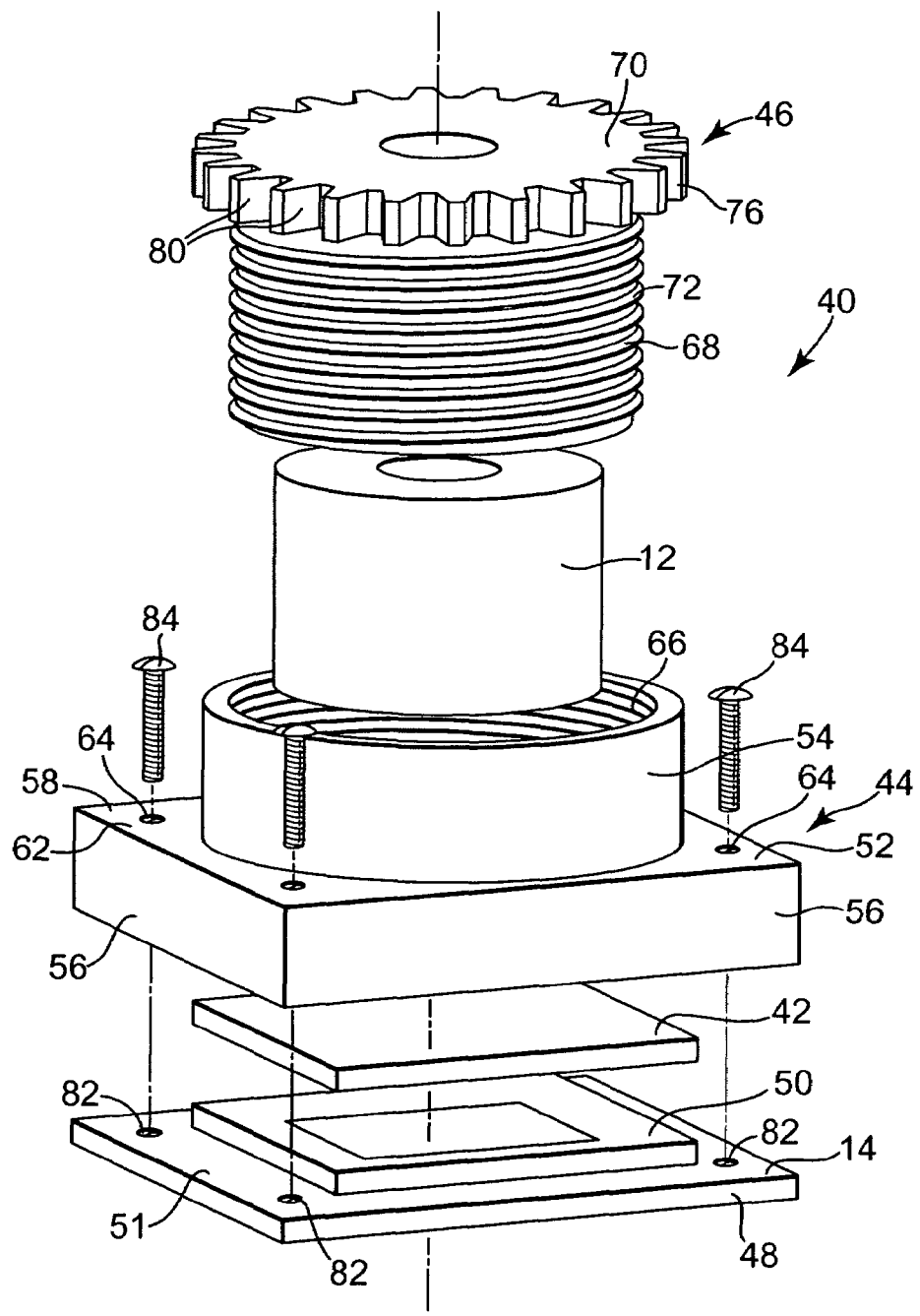
FIG. 2 is an exploded view of a camera module assembly of the digital camera of FIG. 1.

FIG. 2 illustrates an exploded view of a camera module 40 for use in conventional digital cameras 10 or for incorporating into other electronic devices, such as components, PDAs, cellular phones, etc. Camera module 40 includes image sensor 14, an optional infrared filter (IRF) 42, a housing 44, lens 12, and a barrel 46. In one embodiment, image sensor 14 includes a substrate 48 and a die 50. Die 50 is attached to a planar surface 51 of substrate 48. IRF 42 is placed upon die 50 opposite substrate 48. IRF 42 filters the light captured by camera module 40 to decrease the contamination of image sensor 14, more specifically, dies 50, with infrared (non-visible) light.

In one embodiment, housing 44 includes a base portion 52 and an extension section 54. Collectively referring to FIGS. 2 and 3, base portion 52 includes four side walls 56 positioned with respect to one another to collectively form base portion 56 in a rectangular manner. A planar member 58 partially extends between the side walls 56 to define an internal surface 60 and an external surface 62. Extension portion 54 extends from planar member 58, more particularly, from external surface 62. With this in mind, planar member 58 extends from side walls 56 to extension portion 54. In one embodiment, extension portion 54 is centered with respect to side walls 56. In one embodiment, a plurality of threaded cavities 64 extend through planar member 58 parallel side walls 56 spaced from extension portion 54. In other embodiments, base portion 52 does not include threaded cavities 64.

Extension portion 54 is annular in shape and defines an inner threaded surface 66. In one embodiment, extension portion 54 is integrally and homogeneously formed with base portion 52. In other embodiments, extension portion 54 is integrally secured to base portion 52.

Barrel 46 defines a first annular portion 68 and a second annular portion 70. First annular portion 68 defines an outer threaded surface 72 configured to selectively interact with inner threaded surface 66 of housing 44. First annular portion 68 is hollow or tubular in order to circumferentially encompass lens 12.

Second annular portion 70 of barrel 46 extends radially outwardly and inwardly from first annular portion 68. As such, in one embodiment, second annular portion 70 defines an inner diameter smaller than an inner diameter of first annular portion 68. In addition, second annular portion 70 defines an overall outer diameter greater than an overall outer diameter defined by threaded surface 72 first annular portion 68. In one embodiment, an outer periphery 76 of second annular portion 70 defines a plurality of teeth 80 consistently spaced about outer periphery 76. As such, second annular portion 70 substantially forms a toothed gear.

Figure 4:
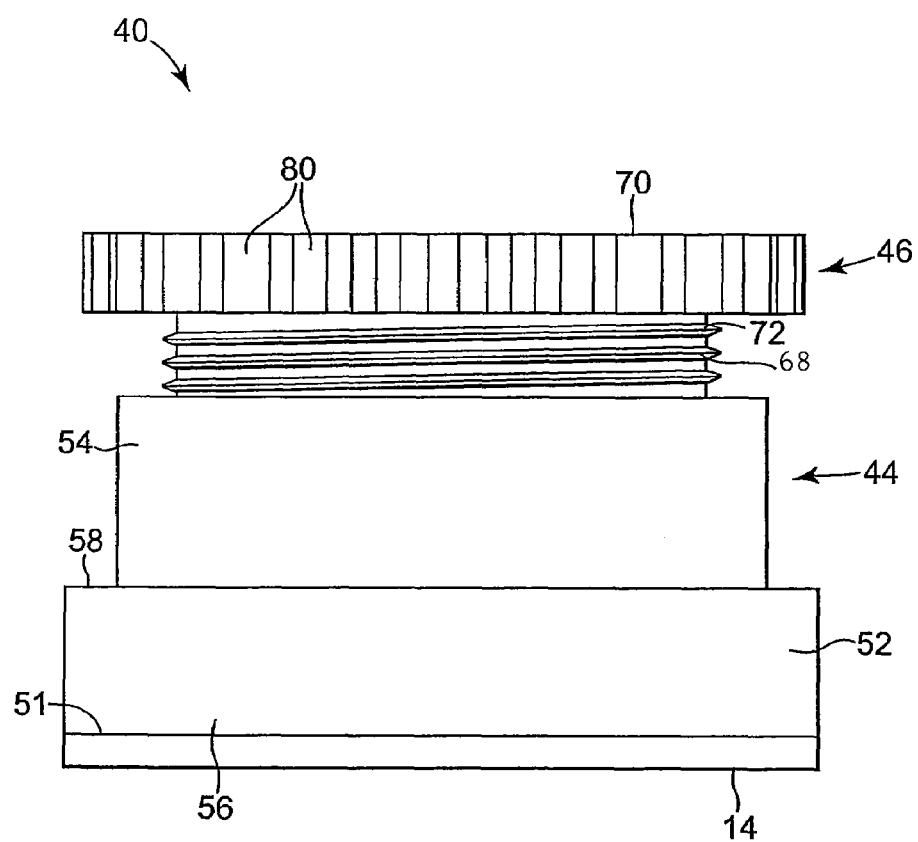
FIG. 4 is a side view of the camera module of FIG. 2.

Upon assembly, IRF 42 is placed upon die 50 of image sensor 14 opposite substrate 48. Housing 44 is secured to image sensor 14 to sandwich IRF between image sensor 14 and housing 44. In particular, as illustrated with additional reference to FIG. 4, side walls 56 of housing 44 interact with planar surface 51 of substrate 48 such that threaded cavities 64 of base portion 52 align with threaded cavities 82 of substrate 48. In one embodiment, threaded screws 84 or other fasteners, such as spring dips, etc., are run through threaded cavities 64 of base portion 52 and into threaded cavities 82 of substrate 48 to secure housing 44 to image sensor 14. In one alternative embodiment, housing 44 is attached to substrate 48 of image sensor 14 with an adhesive or other compound rather than with fasteners 84. In one embodiment, housing 44 is attached to substrate 48 via an adhesive and fasteners 84.

Figure 3:
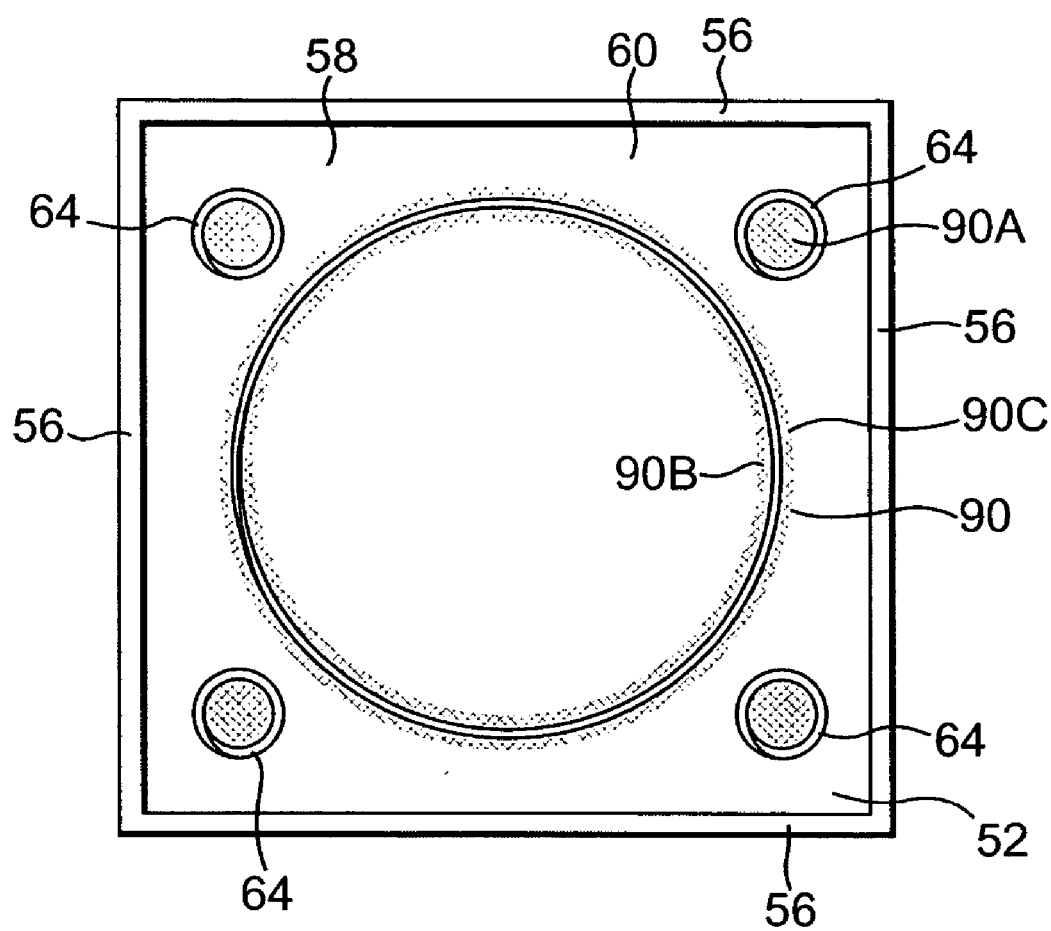
FIG. 3 is a bottom view of a housing of the camera module of FIG. 2.

As illustrated in FIG. 3, in one embodiment, a dust trap substance 90 is placed within threaded cavities 64 and/or within threaded cavities 82 (illustrated in FIG. 2) before threaded screws 84 are thread through the cavities 64 and 82. The positioning of dust trap substance 90 within threaded cavities 64 is generally illustrated at 90A in FIG. 3. Dust trap substance 90 may fill cavities 64 or may be applied in a thin layer to the threads of cavities 64. In either case, dust trap substance is applied to areas of interaction between the cavities 64 and/or 82 and threaded screws 84. In one embodiment, dust trap substance 90 is applied at a thickness of approximately 10μ.

Dust trap substance 90 is configured to capture and maintain dust released from the threads of cavities 64 and/or 82 and fasteners 84 trapped during manufacturing of camera module 40. As such, dust trap substance 90 has an adhesive quality able to capture and maintain at least some of the dust particles released within the assembled camera module 40. In one embodiment, dust trap substance 90 is an adhesive grease.

Dust trap substance 90 has a sufficiently high viscosity in order to be maintained within the cavities 64 and/or 82 into which it was placed. More particularly, dust trap substance 90 has a sufficiently high viscosity to prevent future dripping or migration of dust trap substance 90 from the area substance 90 was originally applied to die 50 of image sensor 14 to prevent dust trap substance 90 from interacting with die 50 to cause image blemishes similar to the image blemishes caused by dust as described above. Further, by maintaining its original position, dust trap substance 90 can more effectively maintain captured dust particles away from die 50.

Due to the temperatures occurring within camera module 40 during use, in one embodiment, dust trap substance 90 is tolerant of high temperatures, In other words, dust trap substance 90 maintains its integrity at relatively high temperatures. In particular, in one embodiment, dust trap substance 90 maintains its integrity at temperatures greater than 60° C. In one embodiment, dust trap substance 90 maintains its integrity at temperatures of up to 235° C.

In one embodiment, dust trap substance 90 is characterized as a non-gas productive grease. Since the productivity of gas could damage components of image sensor 14, the non-gas productive characterization of dust trap substance 90 alleviates the need for ventilating camera module 40.

In one embodiment, dust trap substance 90 is a silicone fluid grease. In a particular embodiment, the silicone fluid grease is an organopolysiloxane mixture, such as the mixture sold by the product name HIVAC-G sold by Shin-Etsu Chemical Company, Ltd. of Tokyo, Japan. In one embodiment, dust trap substance 90 is characterized by a non-structural substance (i.e., as not contributing to the structural integrity or stability of camera module 40).

Although described above as being placed at position 90A within threaded cavities 64 and/or 82 to trap dust previously trapped within the threads of cavities 64 and/or 82 and fasteners 84 migrating to image sensor 14, in one embodiment, dust trap substance 90 is additionally applied circumferentially to internal surface 60 of housing 44 about the interface between planar member 58 and extension portion 54 as generally indicated at 90B. The circumferential application of dust trap 90 at 90B prevents or decreases dust migrating from the outer edges of housing 44 and image sensor 14 to interfere with die 50 of image sensor 14 to cause image blemishes as described above.

In one embodiment, dust trap substance 90 is applied both to threaded cavities 64 and/or 82 and around the extension portion 54 (i.e., In positions 90A and 90B). In this embodiment, dust trap substance 90 within threaded cavities 64 and/or 82 captures dust released from threaded cavities 54 and/or 82 and fasteners 84, and dust trap substance 90 applied around extension portion 54 captures other dust captured within camera module 40 during manufacture. Other additional alternative positions of dust trap substance 90 applications within camera module 40 may also be employed.

Lens 12 is sized to be secured within first annular portion 68 of barrel 46. In particular, in one embodiment lens 12 has a circumferential outer perimeter, which interacts with an inner circumference of first annular portion 68. Barrel 46 at least partially maintaining lens 12 is placed at least partially within extension portion 54 of housing 44. In particular, barrel 46 is placed such that threaded outer surface 72 of barrel 46 interacts with threaded inner surface 66 of extension portion 54 to selectively secure lens 12 and barrel 46 to housing 44.

In one embodiment, dust trap substance 90 is applied to threaded outer surface 72 of barrel 46 and/or threaded inner surface 66 of extension portion 54 (i.e., an area of interaction between barrel 46 and extension portion 54), as generally indicated at 90C, to capture dust or glass particles that may be released during use of camera module 40. In one embodiment, dust trap substance 90 is applied to threaded surface 66 and/or 72 with a thickness of approximately 10 mu. In one embodiment, dust trap substance 90 is applied in at least one of positions 90A, 90B, and 90C.

Rotation of barrel 46 causes barrel 46 to move either further into or further out of extension portion 54 of housing 44. With this in mind, rotation of barrel 46 also serves to move lens 12 either closer to or further away from image sensor 14. Rotation of barrel 46 and the resulting movement of lens 12, thereby, allows camera module assembly 44 to be focused upon a desired subject (not illustrated). Notably, dust trap substance 90 placed between extension portion 54 and barrel 46 does not impede rotation of barrel 46 with respect to extension portion 54. However, dust released during rotation of barrel 46 is at least partially captured and maintained by dust trap substance 90, thereby, decreasing dust falling from barrel 46 and extension section 54 to die 50 of image sensor 14.

A camera module assembly incorporating a dust trap substance in a similar manner as described above serves to trap a plurality of dust particles trapped within the module assembly during manufacture and to prevent or decrease the amount of dust particles from the impacting image sensor, more particularly, the die of the image sensor. As such, use of the dust trap substance maintains the quality of image produced by the camera module by decreasing or preventing blemishes to the image module that would otherwise be caused by the interaction between the dust particles and the die of the image sensor. In addition, the dust trap substance may be used with other dust control manufacturing techniques or blemish disguise methods to further ensure quality of the images produced by the camera module.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A camera module for capturing an image, the camera module comprising:
    a barrel;
    a lens;
    an image sensor including a die mounted on a substrate;
    a housing for substantially enclosing the die and defining a plurality of individual cavities;
    a plurality of individual fasteners extending through the individual cavities, respectively, to attach the housing to the substrate via the plurality of cavities, each cavity and a respective fastener defining a respective mating region therebetween; and
    a dust trap substance adhered to at least one of the respective mating regions, and configured to capture and maintain at least one dust particle to decrease the movement of dust particles within the housing, which decreases a number of blemishes in the captured image,
    wherein the housing includes a base portion and an extension portion, the base portion coupled to the image sensor, the barrel rotatably coupled to the extension portion, and the lens maintained at least partially within the barrel such that the dust trap substance is adhered to the extension portion at positions of interaction between the barrel and the extension portion.

2. The camera module of claim 1, wherein the dust trap substance is an adhesive grease.

3. The camera module of claim 1, wherein the dust trap substance includes a silicone grease.

4. The camera module of claim 1, wherein the dust trap substance includes an organopolysiloxane mixture.

5. The camera module of claim 1, wherein the dust trap substance is tolerant of temperatures over 60° degrees C.

6. The camera module of claim 1, wherein the dust trap substance has a viscosity preventing migration of the dust trap substance from an area of the housing to which the dust trap substance was initially applied.

7. The camera module of claim 1, wherein the dust trap substance is a non-gas producing substance.

8. The camera module of claim 1, wherein each of the cavities includes a threaded portion and the dust trap substance is applied to the threaded portion thereof with a thickness of about 10 μm.

9. The camera module of claim 1, wherein the dust trap substance that is adhered to the extension portion at the positions of interaction between the barrel and the extension portion is configured to circumferentially surround the barrel such that dust particles are substantially prevented from migrating from outer edges of the housing and substrate to the die.

10. A camera module for capturing an image, the camera module comprising:
    a barrel;
    a lens;
    an image sensor;
    a housing coupled with the image sensor; and defining a plurality of individual cavities; an adhesive grease attached to the individual cavities; and
    a plurality of individual fasteners extending through the individual cavities, respectively, to attach the housing to the substrate via the plurality of cavities, each cavity and a respective fastener defining a respective mating region therebetween, wherein the adhesive grease is adhered to at least the respective mating region for capturing dust particles within the housing to decrease the number of dust particles impacting the image sensors;

wherein the housing includes a base portion and an extension portion, the base portion coupled to the image sensor, the barrel being rotatably coupled to the extension portion, and the lens maintained at least partially within the barrel such that a dust trap substance is adhered to the extension portion at positions of interaction between the barrel and the extension portion.

11. The camera module of claim 10, wherein the adhesive grease includes a silicone grease.

12. The camera module of claim 10, wherein the adhesive grease is tolerant of temperatures over 60° degree C.

13. The camera module of claim 10, wherein the adhesive grease has a viscosity preventing migration of the adhesive grease from an area of the housing to which the adhesive grease was initially applied.

14. A method of decreasing blemishes to a digital image of a camera module which includes a housing having a plurality of individual mating units, the method comprising:

assembling a camera module including:

adhering a dust trap substance to the individual mating units of the housing;

coupling the housing to an image sensor including a die, and wherein coupling of the housing to the image sensor substantially encloses the die and includes trapping at least one dust particle within the camera module;

decreasing the number of dust particles to impact the die by capturing and maintaining one of the at least one dust particles within the dust trap substance; and rotatably coupling a barrel to the housing, wherein the adhering of the dust trap substance to the housing includes adhering the dust trap substance to areas of interaction between the barrel and the housing.

15. The method of claim 14, wherein coupling the housing to an image sensor includes placing a fastener through a cavity of each respective mating unit and into a substrate of the image sensor and adhering the dust trap substance to the housing includes adhering the dust trap substance within each respective cavity.

16. The method of claim 14, wherein the dust trap substance is a silicone grease.

17. The method of claim 14, wherein decreasing the number of dust particles to impact the die decreases the number of visible blemishes to the digital image produced by the camera module.

* * * * *

UNITED STATES PATENT AND TRADEMARK OFFICE
CERTIFICATE OF CORRECTION

| | |
|---|---|
| PATENT NO. | : 7,391,466 B2 |
| APPLICATION NO. | : 10/838281 |
| DATED | : June 24, 2008 |
| INVENTOR(S) | : Machida |

It is certified that error appears in the above-identified patent and that said Letters Patent is hereby corrected as shown below:

In column 6, line 37, in Claim 5, after "60°" delete "degrees".

In column 7, line 4, in Claim 10, delete "sensors;" and insert -- sensor; --, therefor.

In column 7, line 15, in Claim 12, after "60°" delete "degree".

Signed and Sealed this

Twenty-sixth Day of August, 2008

JON W. DUDAS
*Director of the United States Patent and Trademark Office*